US007853342B2

(12) United States Patent
Redmann

(10) Patent No.: US 7,853,342 B2
(45) Date of Patent: Dec. 14, 2010

(54) METHOD AND APPARATUS FOR REMOTE REAL TIME COLLABORATIVE ACOUSTIC PERFORMANCE AND RECORDING THEREOF

(75) Inventor: William Gibbens Redmann, Glendale, CA (US)

(73) Assignee: eJamming, Inc., Davenport, FL (US)

( * ) Notice: Subject to any disclaimer, the term of this patent is extended or adjusted under 35 U.S.C. 154(b) by 1099 days.

(21) Appl. No.: 11/545,926

(22) Filed: Oct. 11, 2006

(65) Prior Publication Data

US 2007/0140510 A1 Jun. 21, 2007

Related U.S. Application Data

(60) Provisional application No. 60/725,197, filed on Oct. 11, 2005.

(51) Int. Cl.
*G06F 17/00* (2006.01)

(52) U.S. Cl. ........................................................ 700/94

(58) Field of Classification Search .................... 700/94
See application file for complete search history.

(56) References Cited

U.S. PATENT DOCUMENTS 6,953,887 B2 * 10/2005 Nagashima et al. ........... 84/645
7,096,080 B2 * 8/2006 Asada et al. .................. 700/94
7,119,724 B1 * 10/2006 Asami ........................ 341/118
7,129,408 B2 * 10/2006 Uehara ........................ 84/645
7,254,644 B2 * 8/2007 Norimatsu et al. .......... 709/248
7,297,858 B2 * 11/2007 Paepcke ...................... 84/609
2002/0103919 A1 * 8/2002 Hannaway .................. 709/231

OTHER PUBLICATIONS

Gurevich; Jamspace; presented Apr. 22-27, 2006; CHI conference 2006.*
Sawchuk; From Remote Media Immersion to Distributed Immersive Performance; Copyright 2003.*
Ramakrishnan; The Architecture of Auracle; NIME conference 2004.*
NINJAM; webpage Aug. 24, 2005 downloaded form archive.org.*
Lefford: Recording Studios withour Walls; MIT; copyright 2000.*

* cited by examiner

*Primary Examiner*—Curtis Kuntz
*Assistant Examiner*—Paul McCord

(57) ABSTRACT

A method and apparatus are disclosed to permit real time, distributed acoustic performance by multiple musicians at remote locations. The latency of the communication channel is reflected in the audio monitor used by the performer. This allows a natural accommodation to be made by the musician. Simultaneous remote acoustic performances are played together at each location, though not necessarily simultaneously at all locations. This allows locations having low latency connections to retain some of their advantage. The amount of induced latency can be overridden by each musician. The method preferably employs a CODEC able to aesthetically synthesize packets missing from the audio stream in real time.

8 Claims, 6 Drawing Sheets

METHOD AND APPARATUS FOR REMOTE REAL TIME COLLABORATIVE ACOUSTIC PERFORMANCE AND RECORDING THEREOF

CROSS REFERENCE TO RELATED APPLICATIONS

This non-provisional patent application claims the benefit under 35 USC 119(e) of the like-named provisional application No. 60/725197 filed with the USPTO on Oct. 11, 2005.

FIELD OF THE INVENTION

The present invention relates generally to a system for acoustical music performance. More particular still, the invention relates to a system for permitting participants to collaborate in the performance of music, i.e. to jam, where any performer may be remote from any others, using acoustic instruments and vocals.

STATEMENT REGARDING FEDERALLY SPONSORED RESEARCH OR DEVELOPMENT

Not Applicable

REFERENCE TO COMPUTER PROGRAM LISTING APPENDICES

Not Applicable

BACKGROUND OF THE INVENTION

In U.S. Pat. No. 6,653,545, ('545) Redmann et al. teach a mechanism enabling remotely situated musicians to collaborate using electronic instruments, for instance, commonly available MIDI devices.

The '545 system operates by intercepting the musical events generated by the locally performing musician, e.g. his MIDI controller's output stream. These musical events are sent to each of two places: First, and immediately, to all of the remote musicians via a communication channel. Second, to a local delay where the musical event is held for substantially the same amount of time as is required for the communication channel to transport the events to the others. Upon arrival at the remote location(s), and upon expiration of the local delay, the musical event is played at each of the stations; e.g., the MIDI stream is sent to a MIDI sound generator at each location.

The use of MIDI or similar event-driven representation of a musician's performance has the strong advantage of representing a compact data format. A dataset produced by such a system is considerably smaller than essentially all other representations of musical performance, including MP3 files.

However, the '545 system suffers from two significant drawbacks:

First, there are significantly more musicians for whom the instrument-of-choice is an acoustic instrument and for which they own no acoustic-performance-to-MIDI converter. This is not to say such converters do not exist, for instance MIDI controllers that generate musical events from a musician's guitar performance are available, such as the G-50 manufactured by Roland Corporation U.S. of Los Angeles, Calif. and the GI-20 manufactured by Yamaha Corporation of America of Buena Park, Calif. MIDI events generated by these devices are best rendered on their companion instrument synthesizers 180, Roland's XV 2020 and Yamaha's MU 90R, respectively. Additionally, devices that are played like wind or valve instruments, but generate MIDI controller signals, are also available. However, though the "converter boxes" are easily obtained, they do not represent a significant portion of the guitar and other traditional acoustic instrument population. Moreover, even for musicians who do use MIDI devices, it is frequently the case that their remote jam partners do not have the same MIDI sound generators or software synthesizers. As a result, the remote musicians do not hear the same instrumentation that the originating musician hears and intends.

Second, while the '545 patent teaches a Voice over Internet Protocol (VoIP) approach to providing an intercom with which participants can talk to each other, this technology is completely unsuitable for vocal performances. The buffering typical of the receiving end of a streaming media implementation adds a relatively large amount of latency—generally in excess of 50 mS and often amounting to several seconds, to allow late packets to take their place in the stream and to provide time for the re-send of a dropped packet to be requested and performed.

Nonetheless, individuals have attempted long distance jams using VoIP services such as Skype, by Skype Technologies, S.A. of Luxembourg. The results, however, have been reported as musically unsatisfying, primarily because of the latencies encountered.

A lower latency approach is to use "plain old telephone services" (POTS), which provides a low latency, high reliability transport for audio. Two musicians, each with a speakerphone can jam. Such a solution suffers two primary drawbacks: First, the bandwidth of POTS is limited to a little less than 4,000 Hz. This represents a serious impact to perceived audio quality of music. The second drawback is that, although the latency is typically small, each performer hears the other play 'behind' the beat, that is, each hears the other performing late. The result is that in an otherwise unregulated jam, both players will 'slow down' to accommodate the other's tardiness, and the result is an ever-slower tempo. Even if one or the other players has a metronome to govern the beat, the remote player will sound to the metronome-owning musician as if he is playing late by twice the communications channel latency.

Though today, VoIP services do not typically achieve latencies as low as POTS, that is not expected to remain the case. A number of improvements to Internet packet handling have been defined, and over the coming years will be pervasively fielded. Among these include prioritization for VoIP data packets, so that VoIP data are provided low latency routes, and priority handling by intermediate routers so that packets are not-queued behind, say, file transfers, including music downloads. Such improvements to the Internet protocols will result in VoIP transport latencies approaching that of the POTS systems.

Currently, because of bandwidth limitations common over network connections such as the Internet, it is desirable for a VoIP connection that the audio to be compressed, or coded. Upon receipt at a remote station, the coded audio signal requires decompression, or decoding. The matched pair of algorithms that COmpresses (or COdes) and DECompresses (or DECodes) a signal in this way is known collectively as a CODEC, and there are many well known CODEC algorithms. CODECs may be implemented in hardware, or software, or a combination of the two.

Presently, the most popular CODEC for audio is MP3. MP3 achieves a high degree of compression by disregarding information corresponding to attributes of the audio that human beings don't notice. MP3 is readily able to compress digitized audio to less than a tenth its uncompressed size, and to restore the audio signal to a good facsimile of the original, at least as far as most human listeners are concerned.

However, many CODECs such as MP3 require all of the original compressed audio stream to be received for reconstruction of a continuous audio signal. There is little the MP3 CODEC can do during an interval for which no representative packet is received: the reconstructed audio will cut out. The Internet is an environment prone to packet loss. To overcome this, when audio is streamed over the Internet (compressed or not), consecutive packets are buffered at the receiving end for a relatively long period of time, such as ten seconds. By requiring that this much audio be accumulated in a buffer before it is played, there is an opportunity for the receiving station to request retransmission of a missing packet, and to still have time for its retransmission and receipt before it is needed.

However, while a deep receive buffer works well for one-way communication, is not a good solution for acoustic performers collaborating in real time. The additional delay required by the receive buffer will reduce or destroy any real time effect. In order to jam effectively, musicians will require a very short receive buffer and there is not typically time for retransmission of a missing packet.

In addition to inherent unreliability of packet delivery, networks such as the Internet also have communication latencies that can vary by packet. Packets can even be delivered out of order.

To resolve these issues, selection criteria for a CODEC should emphasize an ability to continue the real time musical or vocal performance with an aesthetically tolerable handling of dropped or late packets.

In their article "A Survey of Packet-Loss Recovery Techniques," IEEE Network Magazine, September/October 1998, author Perkins, et al. describe a variety of methods by which packet loss of an audio stream may be handled. In the context of wireless telephony, they discuss compensation techniques for packet loss in a voice stream as a hierarchy of increasingly sophisticated schemes:

The simplest scheme when a packet is lost, is just to play silence. If the transmission was significantly silent before when the packet is lost, this may represent a good substitute. This is implemented exclusively by the receiving portion of the CODEC.

During a vocal or instrumental performance, however, a significant portion of the time a note is being held and undergoing a prolonged decay, or is being sustained. A sudden transition to silence and back again can produce a very unaesthetic pop.

Perkins, et al. point out that the physiology of human hearing actually reacts better to an interval of white noise, instead of silence, replacing a missing packet. Preferably, the noise has an amplitude similar to that of the prior packet.

Another crude-but-sometimes-effective scheme sometimes used in telephony is to replay the previous packet. Again, during a relatively quiet portion of the transmission, this will work well. During an unformed, noisy interval, it also works well. This technique is also implemented exclusively by the receiving portion of the CODEC.

For a vocal performance or an instrumental performance having a slow or moderate tempo, repeating the prior packet may sometimes work well, but audio elements representing a fast attack like a drum beat or a guitar string pluck may sound like the performer has played a second note, which may be more disruptive than noise of a similar amplitude.

If repetition is employed, and then needed to compensate for multiple consecutive lost packets, then the amplitude used should fade with each repetition. In the case where performance by a musical instrument such as a guitar or piano is used, the rate at which repeated packets are faded preferably resembles the observed decay rate of the instrument's performance.

In Perkins' review, they talk about the transmission portion of the CODEC helping compensate for missing packets, too.

Interleaving is a technique in which data representative of N consecutive intervals is spread over time: Their transmission is interleaved with additional groups of N consecutive intervals. If a single packet is lost, exactly one of the intervals from each group of N consecutive intervals is lost. This can be of value if disguising or overcoming a frequent loss of a single short interval produces a better result than an occasionally loss of N consecutive intervals. Interleaving has the detrimental effect of introducing a receive buffer delay corresponding to (N*N) intervals, but even when N=2, the intervals would need to be very short for this to be tolerable.

Forward Error Correction (FEC) is another technique the sending portion of the CODEC can use to improve handling of lost or delayed packets. All FEC techniques introduce some redundant data in each packet that can aid in the reconstruction of previously sent but subsequently lost packets. In its simplest version, each packet contains not only its own new data representative of an interval, but fully repeats the data representing the prior packet's interval. While this introduces a 100% increase the data that must be transmitted, it adds a receive buffer delay of only one interval.

A number of CODECs intended for VoIP use are commercially available. Each has various parameters, such as sample rate, bandwidth limitations, data rates, strategies for overcoming packet loss, etc. One key parameter is frame size. Frame size is the number of data samples times the sample rate, and is commonly expressed in milliseconds. Large frame sizes provide more opportunity for a CODEC to achieve data compression, but unfortunately result in longer buffering times both at the transmitting and receiving ends of the connection. For real time musical performance, short frame sizes (e.g., 10 mS) are preferred, and known. Some commercially available, short frame size CODECs even support an audio bandwidth exceeding that of an ordinary telephone connection (e.g., >8 k samples/sec). An example is iPCM-wb™ by Global IP Sound of Stockholm, Sweden which can operate with a 10 mS frame size and 16K samples/sec. Between this improvement in bandwidth over a POTS call, and anticipated improvements in transport latencies for VoIP, such a connection would be preferable to a simple POTS connection. However, it still suffers from the musicians' mutual perception of always being late with respect to the beat.

There remains a need for a way to permit multiple remote acoustic performers to collaborate in real time and over useful distances, such as across neighborhoods, cities, states, continents, and even across the globe.

There is a further need to enable them to record those collaborations.

Because of the delays inherent in communication over significant distances, a technique is needed which does not compound that delay.

Further, there needs to be a way of limiting the adverse effects of excessive delay, and to allow each station to achieve an acceptable level of responsiveness.

The present invention satisfies these and other needs and provides further related advantages.

OBJECTS AND SUMMARY OF THE INVENTION

The present invention relates to a system and method for acoustic performance, typically with one or more other musicians, that is, jamming, where some of the other musicians are at remote locations.

Each musician has a station, including an acoustic input, and access to a communication channel. The communication channel might be a POTS or ISDN connection to the telephone network, or a digital connection via DSL or cable modem to the Internet or other local or wide area network.

When musicians desire a jam session, their respective stations contact each other and determine the communication delays to and from each other station in the jam.

Subsequently, each musician's performance is immediately transmitted to every other musician's station. However, each musician's own performance is delayed before being played locally.

Upon receipt, remote performances are also delayed, with the exception of the performance coming from the station having the greatest associated communication channel delay, which can be played immediately.

The local performance is played locally after undergoing a delay equal to that of the greatest associated network delay.

By this method, each musician's local performance is kept in time with every other musician's performance. The added delay between the musician's performance and the time it is played, becomes an artifact of the performance environment, much as a musician on a stage hears his own playing from a monitor speaker located some distance away. In live, on-stage performance, the performance is electrically transmitted from a microphone or other pickup to the monitors with negligible delay, however the in-air time-of-flight to the musician's ears is about 1 mS per foot. Just as a musician standing on-stage some distance from the monitor speaker compensates for the delay imposed, so does a musician "play ahead" or "on top of" the jam beat to compensate for the communication channel delay as presented by the present invention.

Sometimes, two of the stations may have a low (good) communication delay between them, while others may have a high (bad) delay. In such a case, each musician can choose to have his station disregard high delay stations during live jamming, and to allow performance with only low delays.

It is the object of this invention to make it possible for a plurality of musicians to perform and collaborate in real time, even at remote locations.

In addition to the above, it is an object of this invention to limit delay to the minimum necessary.

It is an object of this invention to incorporate the artifacts of communication delay into the local performance in a manner which can be intuitively compensated for by the local musician.

It is a further object to permit each musician to further limit delay artifacts, to taste.

Another object of this invention is to permit the performances to be recorded, without the effects of any bandwidth limitations or dropouts imposed by the nature of the communication channel or CODECs selected.

These and other features and advantages of the invention will be more readily apparent upon reading the following description of a preferred exemplified embodiment of the invention and upon reference to the accompanying drawings wherein:

BRIEF DESCRIPTION OF THE DRAWINGS

The aspects of the present invention will be apparent upon consideration of the following detailed description taken in conjunction with the accompanying drawings, in which like referenced characters refer to like parts throughout, and in which.

While the invention will be described and disclosed in connection with certain preferred embodiments and procedures, it is not intended to limit the invention to those specific embodiments. Rather it is intended to cover all such alternative embodiments and modifications as fall within the spirit and scope of the invention.

DETAILED DESCRIPTION OF THE INVENTION

Figure 1:
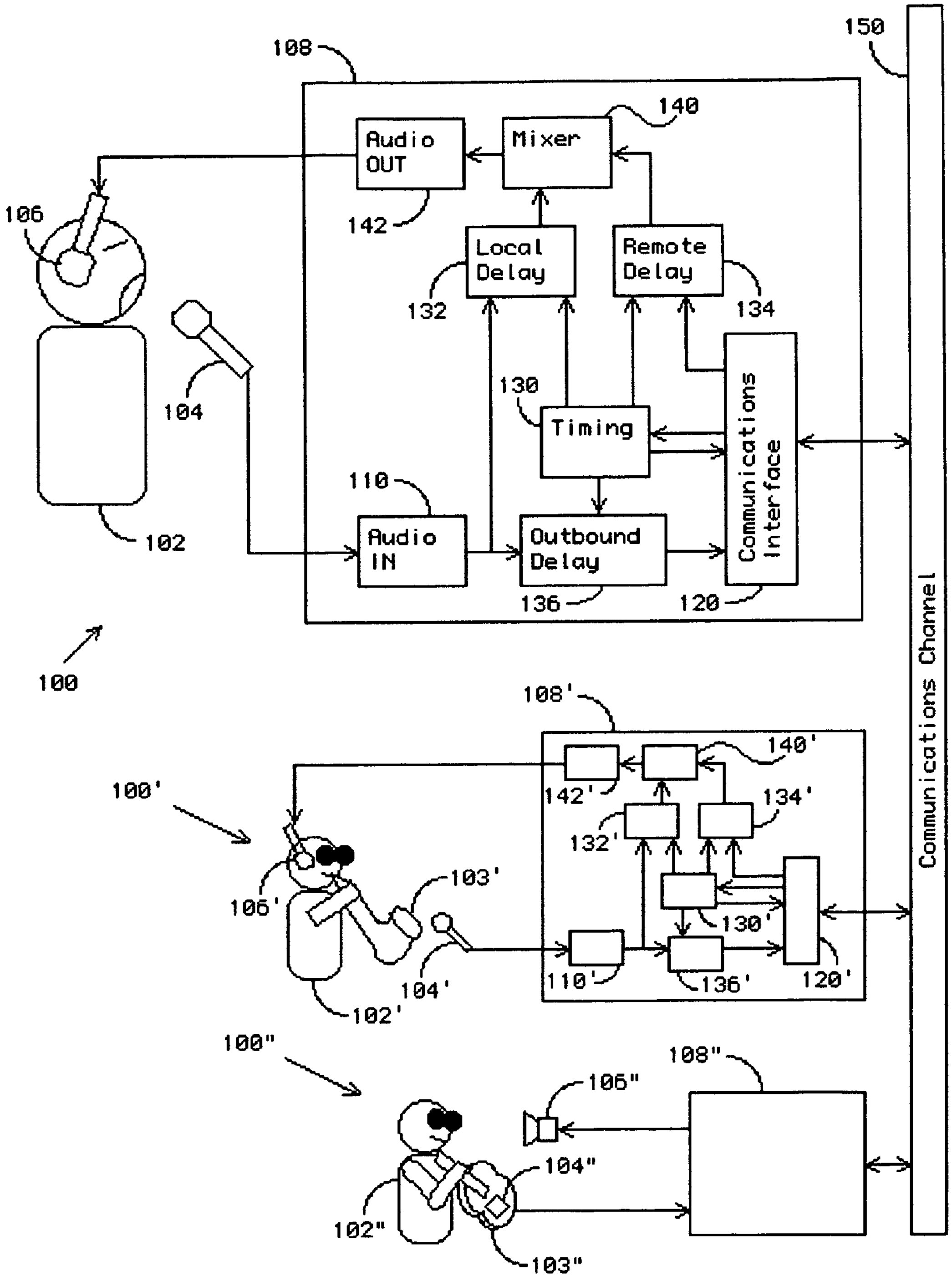
FIG. 1 is a detailed block diagram of multiple acoustic performance stations configured to jam over a communications channel.

Referring to FIG. 1, a plurality of acoustic performance stations represented by stations 100, 100', and 100" are interconnected by the communication channel 150. The invention is operable with as few as two, or a large number of stations. This allows collaborations as modest as a duet played by a song writing team, up to complete orchestras, or larger. Because of the difficult logistics of managing large numbers of remote players and commonplace limitations of bandwidth, this invention will be used most frequently by small bands of two to five musicians.

Note that while the term "musician" is used throughout, what is meant is simply the user of the invention, though it may be that the user is a skilled musical artist, a talented amateur, or musical student.

Presently, communications channel 150 is preferably a telephone network, though that places substantial limitations on interconnectivity (i.e. station-to-station, or requiring the arrangement of a two-way or conference call) and a limit on audio quality and bandwidth. Alternative embodiments include a local or wide area Ethernet, the Internet, or any other communications medium. However, the bandwidth limitations and uncertain timing of delivery provided by packet switched networks, such as Ethernet or Internet, will have an adverse effect on the quality of the real time performance. As known, present day improvements to the infrastructure of the Internet achieve widespread implementation, the preferred communication channel 150 will become the Internet. For this reason, both telephone and Internet based implementations are disclosed in detail herein.

In FIG. 1, each of remote acoustic performance stations 100' and 100" mirror the elements of local acoustic performance station 10. Each of acoustic performance stations 100, 100', and 100" have performer 102, 102', and 102", audio input transducer 104, 104', 104", audio output transducer 106, 106', and 106", and audio processor 108, 108', and 108", respectively. Each of the acoustic performance stations 100, 100', and 100" is connected to the communication channel 150, through which the stations can interconnect.

Performer 102 is, by way of example, a vocalist or singer whose performance is captured by audio input transducer 104, a microphone. Vocalist 102 monitors the aggregate performance on audio output transducer 106, headphones.

Performer 102'is, again by way of example, a performer who uses an acoustic instrument 103', in this case, a saxophonist. The performance by saxophonist 102' is captured by audio input transducer 104', also a microphone. The saxophonist's audio output transducer 106' is headphones, too.

Performer 102", a guitarist, uses an electric guitar 103" with audio input transducer 104" comprising an electronic pickup on the guitar. A preamp (not shown) may be needed for such a hookup, which may also include various effects boxes (not shown), all well known to the industry. An instrument such as that of guitarist 102" doesn't produce a substantially loud performance on its own, unlike the vocalist 102 or saxophonist 102'. Thus, guitarist 102" doesn't require the isolation from the live acoustic performance provided by headphones 106 and 106', and can instead monitor the aggregate performance from audio processor 108" over speaker 106".

These specific examples of performers are not meant to be limiting, merely illustrative. For example, a performer could sing and play simultaneously, or the performer might be a group, i.e. a choir or several members of a band. A plurality of microphones and/or pickups may be used at a single station, the individual feeds mixed together by additional equipment (not shown) to form a composite feed into audio in 110.

Audio processors 108 and 108' comprise audio input 110 and 110', communication channel interface 120 and 120', a timing control 130 and 130', local delay 132 and 132', remote delay 134 and 134', mixer 140 and 140', and audio output 142 and 142', all respectively. Outbound delay 136 is used apply information from timing control 130 to audio sent stations 100' and 100", described in more detail below in conjunction with FIGS. 2 and 4. Outbound delay 136' provides a similar service, if needed.

In reference to audio processor 108, audio input 110 conditions and feeds the signal from the audio input transducer 104 to both the communication channel interface 120 through outbound delay 136, and the local delay 132. The timing control 130 detects the latency conditions to each other station 100' and 100" over the communication channel 150 and sets local delay 132 and remote delay 134 accordingly. The outputs of the two local delay 132 and remote delay 134 are combined by mixer 140, preferably providing performer 102 with a means to control the level of the audio signals independently. The resulting combined audio signal is provided to audio out 142, which preferably conditions the signal and provides amplification, as needed.

Remote delay 134 preferably acts distinctly upon each remote audio signal being received at station 100 from of remote acoustic performance stations 100' and 100".

A variety of embodiments for an audio processor 108, 108', and 108" are contemplated. Embodiments of the audio processor can vary, for example, depending upon the nature of the communication channel 150 or the number of stations 100, 100', and 100" participating.

One embodiment of audio processor 108, for instance, considers communication channel 150 being a switched telephone network, where the connection from channel interface 120 to the communication channel 150 is made through a telephone jack.

Channel interface 120 preferably comprises a latching line switch and telephone dial pad to enable audio processor 108 to connect to a like station 108' by allowing the musician 102 to dial the telephone number where the other station 108' is located. Receipt by station 108' of such an incoming call would be initiated by activating a like latching line switch on channel interface 120'.

Once a connection is initiated and accepted, timing controls 130 and 130' interact to determine the round trip latency between the two stations. The timing control 130 of calling station 100 emits a first signal. Coincident with the emission, a first timing measurement is begun. When the first signal is detected by the timing control 130' of receiving station 100', timing control 130' would respond by transmitting in response a second signal back to station 100 and preferably initiating a second timing measurement of its own. Upon receipt of the second signal, timing control 130 concludes the first timing measurement, and thereby estimates round trip time (RTT).

To enable timing control 130' to estimate RTT, control 130 may acknowledge the response signal from 130' with a third signal. Upon receipt by timing control 130' of this third signal, the second timing measurement is concluded and thereby a measure of RTT by the remote station 100' is obtained.

In an alternative embodiment, timing controls 130 and 130' are aware of any inherent delay in the process of detecting signals such as the first, second, and third signals. This inherent detection delay is subtracted twice from the RTT measurement.

Further, station 130' may deliberately introduce a predetermined delay between the time the first signal is detected and the time the second signal is sent. This predetermined delay is subtracted from the RTT measurement and would be used, if needed, to separate the first from the second signal, and the second from the third, as needed to facilitate accurate or reliable measurement.

Alternatively, timing control 130 would emit no third signal. Once timing control 130 has an acceptable estimate of round trip time, it can cease emitting the periodic first signals. Upon detecting the cessation of the first signals, timing controller 130' begins to emit the periodic first signals and initiates its own second timing measurement, to which timing control 130 responds with its version of the second signals. When received by timing controller 130', the second timing measurement is concluded and the RTT obtained.

Multiple first and second timing measurements can be made and averaged to obtain a better estimate of RTT by each station.

Preferably, each of the first, second and third signals provides a well defined mark, such as an abrupt phase shift or change in the width of a stream of pulses, which can be clearly detected and resolved sharply as to its timing.

Each station 100 and 100' can divide their respective RTT measurements by two to obtain the communication latency.

With the communication latency established in this manner, timing control 130 preferably sets local delay 132 to value of the communication latency, and the value of the remote delay 134 to zero. Alternatively, performer 102 may specify a preferred delay to timing control 130 that is at least equal to the communication latency. This specified delay is applied to local delay 130, and the amount by which the specified delay exceeds the actual communication latency is applied to remote delay 134. This embodiment allows the performer 102 to experience the same performance delay locally, regardless of the actual communication latency, allowing him to practice with the behavior of the system remaining constant. Note that the setting of communication latency 132 has no direct effect on the experience of performer 102' and audio processor 108.

In another alternative embodiment, the process of setting local delay 132 and remote delay 134 can be performed manually. The manual procedure would work like this: Local delay 132 is manually set (this control not shown) to a value presumed to be higher than the RTT. A jumper (not shown) is installed to connect the audio OUT 142' to audio IN 110', on remote audio processor 108'. The monitor level for the local performance is set to zero for mixer 140', a step necessary to prevent feedback at station 100'. With this configuration, performer 102 produces a sound, such as a clap. This sound enters local delay 132 and is held for a 'long' time. The sound is simultaneously transmitted to station 100', where it is received, produced at audio OUT 142', and because of the jumper (not shown), routed back to audio IN 110', resulting the sound being returned to station 100. Upon receipt, the sound is played by audio OUT 142, and heard on headphones 106. Some time thereafter, local delay 132 has lapsed, and the locally delayed copy of the sound is played through audio OUT 142 and is also heard on headphones 106.

By adjusting the manual setting for local delay 132, the locally delayed copy of the sound can be moved earlier or later relative to the copy returned from station 100'. Manual adjustments are made and the sound is repeated by performer 102, until the local delay 132 substantially matches the RTT, and the two copies of the sound play essentially simultaneously from audio OUT 142. At this point, a reading off the manually set local delay control (not shown) would represent the RTT. Performer 106 can divide this reading by two, and report the result to performer 102'. Both performers 102 and 102' would then use that halved value as the manually entered setting for local delay 132.

Figure 2:
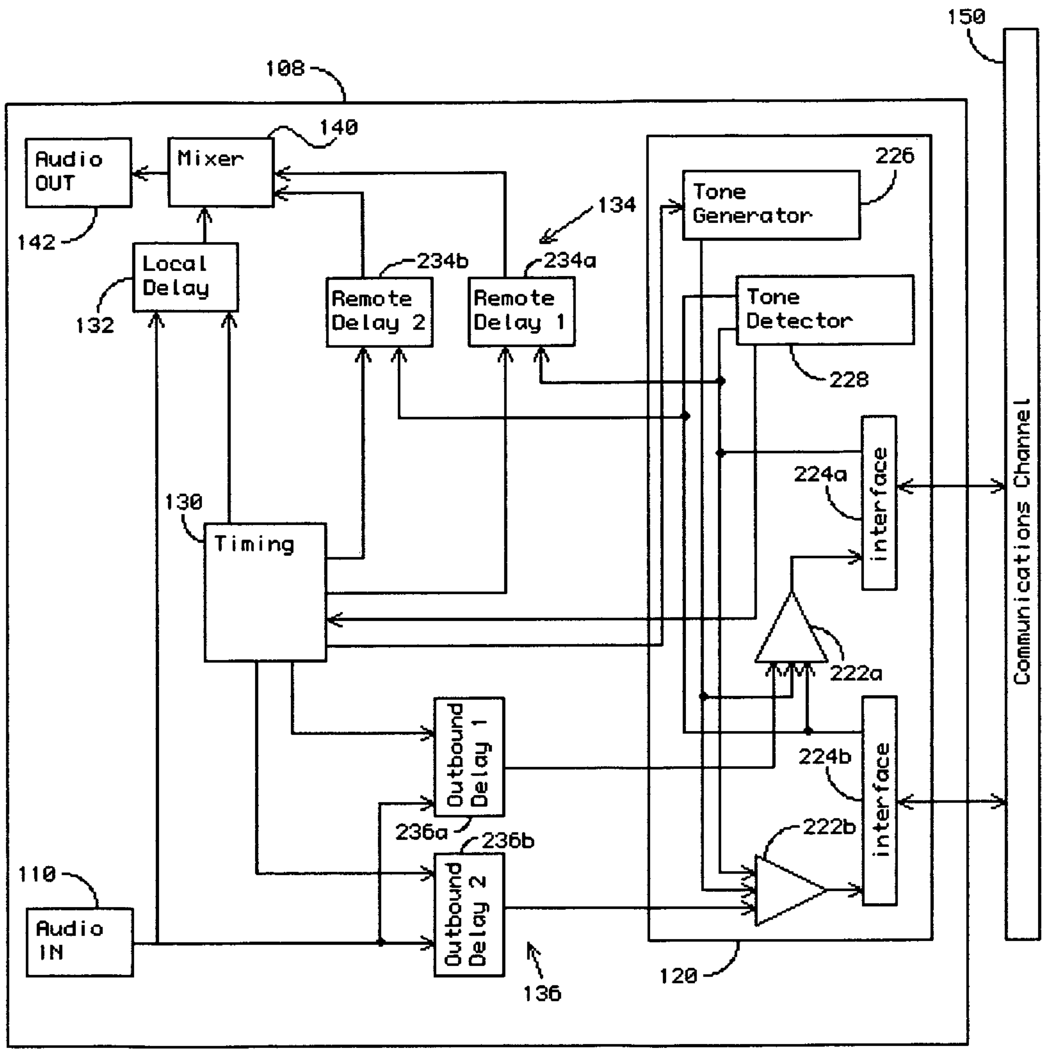
FIG. 2 is a detailed block diagram of an audio processor 108 suitable for use with two telephone lines.
Figure 3:
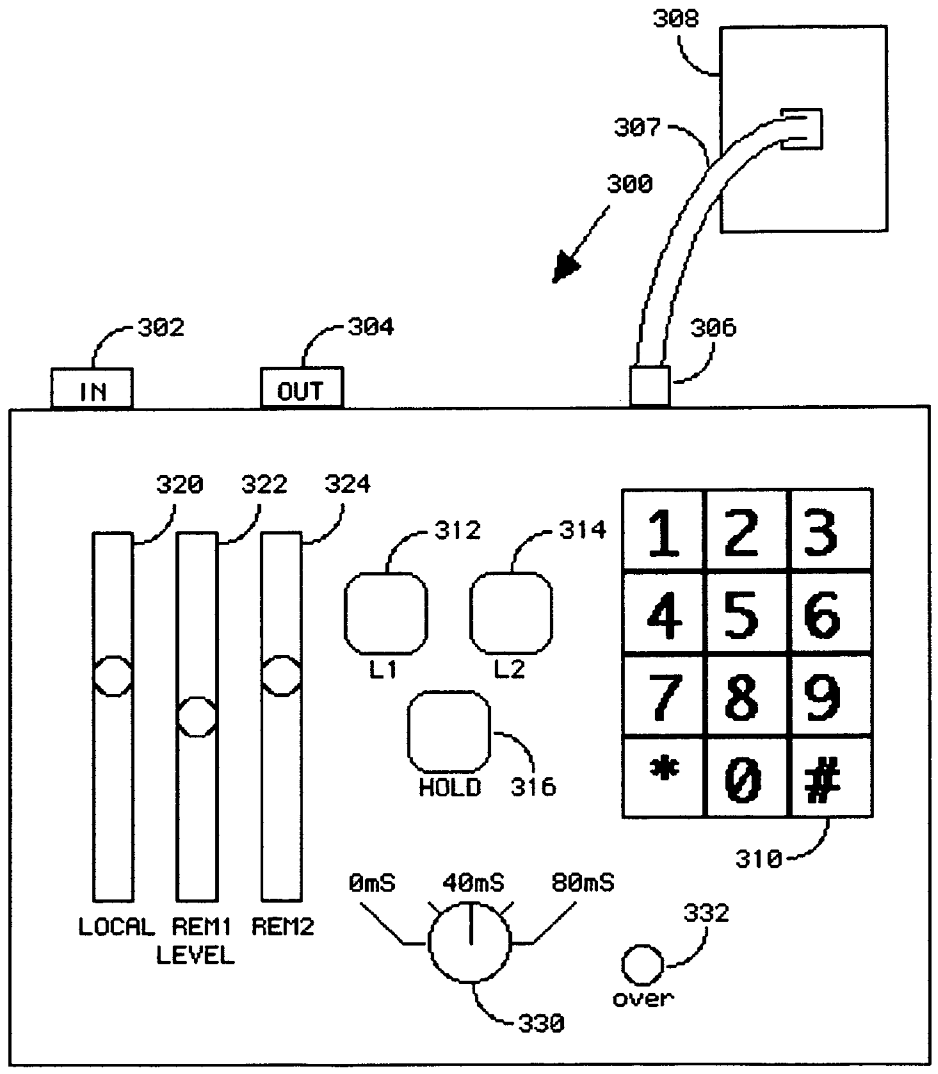
FIG. 3 is a preferred control panel for audio processor 108.

In an alternative embodiment, also using the switched telephone network as communication channel 150, channel interface 120 of station 100 can employ a two-line telephone connection. A more detailed block diagram of audio processor 108 appropriate to this embodiment is shown in FIG. 2 and the controls provided to performer 102 are shown in FIG. 3, both addressed in the following description:

In the two-line telephone-based embodiment, control box 300 implements audio processor 108. Input jack 302 comprises a standard socket into which microphone 104 may be plugged to connect with audio IN 110. Output jack 304 comprises a standard socket into which headphones 106 may be plugged to connect with audio OUT 142. Two-line phone jack 306 accepts a standard two-line telephone cable 307 to two-line telephone wall jack 308. Jack 306 and cable 307 implement a connection between channel interface 120 and communication channel 150, in this case comprising the two-line telephone wall jack 308 and the balance of the telephone network.

Well known in the art relative to two-line telephony equipment are line select buttons 312 and 314, for lines one and two, respectively, and hold button 316. Touch-tone dial pad 310 controls touch-tone generator 226.

Preset delay dial 330 accepts the delay preference setting of performer 102, and overage indicator 332 can illuminate to indicate if the selected preference has been exceeded by the measured latency (half RTT).

Level controls 320, 322, and 324 are used by performer 102 to adjust mixer 140 to set the volumes of the local performance, and the remote performances of stations 100' and 100", respectively.

In FIG. 2, outbound delay 136 comprises outbound delay for line one 236*a* and outbound delay for line two 236*b*, remote delay 134 comprises remote delay for line one 234*a* and remote delay for line two 234*b*, channel interface 120 comprises both outbound mixers 222*a* and 222*b* and telephone interfaces 224*a* and 224*b*, for lines one and two, respectively throughout.

Delays such as 132, 234*a*, 234*b*, 236*a*, and 236*b* for use with audio are well known in the art. A common implementation with bucket-brigade analog shift registers, such as represented by the SAD1024 manufactured by EG&G Reticon of Sunnyvale, Calif. circa 1977, however that part is now obsolete. Alternatively, a circuit could be derived from the one suggested by Jim Walker in his article "Low-Cost Audio Delay Line Uses 1-Bit ADC," Electronic Design, Jun. 7, 2004, Penton Media, Inc., Cleveland, Ohio. In each case, a controllable delay is achieved by varying either the clock rate or shift register length. While such circuits do not provide a high fidelity handling of the audio signal, they are low cost and certainly have adequate performance in conjunction with the bandwidth limitations and noise levels inherent in POTS communications.

Preferably, however, the variable delays are implemented in software, wherein audio IN 110 digitizes signals it receives, and all subsequent processing by audio processor 108 is carried out substantially in the digital domain. Once audio has been digitized, subsequent processing can either be carried out with specifically arranged hardware gates and registers, or preferably, in software running on a general purpose microprocessor, or digital signal processor. Audio OUT 142 would convert the resulting digital signals from mixer 140 into an analog signal. Communication channel interface 120 may be required to convert signals to and from communication channel 150 to the appropriate domain (analog or digital), as appropriate. Practitioners will recognize that ordinary skill in the art is sufficient for any of these implementations.

In the two-line implementation of FIG. 2, outbound delay 136 is preferably comprised of two separate delays, outbound delay for line one 236*a* and outbound delay for line two 236*b*. Each provides its delayed signal to mixer 222*a* and 222*b* respectively, through which the corresponding signal is send out through interfaces 224*a* and 224*b*, via communications channel 150, to two remote stations. The inbound signal from the first remote station is received at interface 224*a*, and sent both to remote delay A 234*a*, and also into the mixer 222*b*, so as to be relayed to the second remote station. Likewise, inbound signal from the second remote station is received at interface 224*b*, and sent both to remote delay B 234*b*, and also into the mixer 222*a*, so as to be relayed to the first remote station.

Use of controls in control box 300 in the two-line telephone embodiment is as follows:

At station 100, performer 102 presses first line button 312. Communication interface 224*a* causes a connection to be made to line one of jack 308, and a dial tone is heard. Performer 102 dials the telephone number for station 100', using keypad 310, which produces tones from generator 226, which are routed through mixer 222*a*, to channel interface 224*a*, resulting in the first call being dialed to the first remote station 100' (see FIG. 1).

Performer 102' at station 100' answers the call. In the manner described above, station 100 initiates the test to determine communication latency to station 100'. Timing control 130 causes the first signal to be automatically generated by tone generator 226. The first signal proceeds through mixer 222*a* to channel interface 224*a* to station 100', and subsequent detects the arrival of the second signal from station 100' through channel interface 224*a* at tone detector 228, which notifies timing 130. The third signal is commanded by timing control 130 to be generated by tone generator 226, and sent to station 100' immediately upon receipt of the second signal from station 100'. The RTT between stations 100 and 100' is established. Dividing the RTT by two to produces the communication latency, X, for those stations.

As noted above, if there is a known detection latency in tone detector 228, twice that amount is subtracted from the RTT before dividing to determine X.

Similarly, if timing controls 130 and 130' incorporate a predetermined hold-off to allow settling time between measurements to mitigate detection error, then that predetermined time is likewise subtracted. Such a hold-off is improves crosstalk immunity in the case where interface 224*a* imperfectly isolates outbound signals from inbound signals.

Once connected with station 100', performer 102 places the first call on hold by pressing hold button 316. Channel interface 224*a* switches to an on-hold status.

A second call is placed by performer 102 by pushing line button 314 to select line 2. Now, channel interface 224*b* is used, when the musician dials with touchpad 310 and touchtone signals are generated by tone generator 226 and sent through mixer 222*b* and channel interface 224*b* to cause the connection to be made to station 100". Again, timing control 130 commands signal generator 226 to produce the first signal which is sent now through mixer 222*b* to channel interface 224*b* to station 100". When the second signal is received from station 100", tone detector 228 signals timing control 130, which recognizes the true measurement of the RTT between station 100 and station 100" and divides by two to get the communication latency, Y, between those stations. However, an additional delay of twice X is introduced before the third signal is sent back to station 100". In this manner, station 100" will measure a RTT of (2*Y)+(2*X), or 2*(X+Y). When station 100" divides its RTT measurements by two, it therefor calculates a communication latency of (X+Y).

Once the actual latency to both stations 100' and 100" have been established by timing control 130, timing control 130 preferably takes over management of both calls. Timing control 130 causes line two to be placed on hold, and removes the hold from line one. Now, timing control 130 re-initiates the RTT calculation sequence with station 100', but with the following modification: Upon receiving the second signal from station 100', timing control 130 introduces an additional delay of twice Y before the third signal is sent back to station 100'. In this manner, station 100' will measure a new RTT of (2*X)+(2*Y), or 2*(X+Y). When station 100' divides this new RTT measurement by two, it calculates the same communication latency as did station 100", (X+Y).

Now, timing control 130 has caused remote audio processors 108' and 108" to become configured for this call. Timing control 130 configures outbound delay 136 so that the outbound delay for line one 236*a* introduces an outbound delay of Y, and sets the outbound delay for line two 236*b* to X. Further, remote delay 234*a* is set to Y, or if delay preset control 330 indicates a value higher than (X+Y), then that value less X. Remote delay 234*b* is set to X, except if the delay preset control 330 indicates a value higher than (X+Y), and then that value less Y. Local delay 132 is set to the greater of (X+Y) and the value indicated by delay preset control 330. If (X+Y) is greater than the value indicated by preset control 330, then indicator 332 is lit to indicate that the value preset is inadequate.

A similar setting of the corresponding delays in processors 108' and 108" are made relative to their own controls, except that their baseline outbound delays are zero.

Alternatively, to rely on a manual setting, local delay 132 may be set to the value indicated by delay preset control 330, and the user may manually adjust the control 330 to the setting where indicator 332 just extinguishes.

In this way, the three stations 100, 100', and 100" are configured so that all stations not warning with indicator 332 experience a local delay of at least (X+Y), and provides that audio received from any remote station has that same aggregate delay imposed.

Audio captured from performer 102 by microphone 104 is subjected to an outbound delay for line one of Y at 236*a*, before being sent to station 100' through mixer 222*a* and channel interface 224*a* and experiencing actual communication latency of X, whereupon it arrives with total delay of (X+Y). Similarly, that same audio captured is subjected to an outbound delay for line two of X at 236*b* before being sent to station 100" through mixer 222*b* and channel interface 224*b* and experiencing actual communication latency of Y, whereupon it arrives with the same total delay of (X+Y).

Audio captured from performer 102' by audio processor 108' is sent without any outbound delay to station 100. Upon receipt by interface 224*a*, it has thus far suffered an actual communication latency of X. This audio from station 100' is immediately directed through mixer 222*b* and out interface 224*b*, whereupon it experiences the additional communication latency of Y, before arriving at audio processor 108" of station 100". Where upon it is rendered on audio output transducer 106", for performer 102" with an aggregate latency of (X+Y), unless performer 102" has set a higher latency, which would be achieved by audio processor 108" adding a remote delay value (not shown).

The audio from station 100', received at interface 224*a* having accumulated an actual communication latency of X, is also directed to remote delay 234*a* which provides an additional delay of at least Y, as discussed above. Where upon the audio from station 100' is mixed with the audio produced locally and from station 100" according to the levels set using controls 322, 320, and 324, respectively, and provided to performer 102 through audio OUT 142 and headphones 106.

For the remaining station, audio captured from performer 102" by audio processor 108" is sent without any outbound delay to station 100. Upon receipt by interface 224*b*, it has thus far suffered an actual communication latency of Y. This audio from station 100" is immediately directed through mixer 222*a* and out interface 224*a*, whereupon it experiences the additional communication latency of X, before arriving at audio processor 108' of station 100'. Where upon it is rendered on audio output transducer 106' for performer 102' with an aggregate latency of (X+Y), unless performer 102' has set a higher latency, which would be achieved by audio processor 108' adding a remote delay value at 134'.

The audio from station 100", received at interface 224*b* having accumulated an actual communication latency of Y, is also directed to remote delay 234*b* which provides an additional delay of at least X, as discussed above. Where upon the audio from station 100" is mixed with the audio produced locally and from station 100' according to the levels set using controls 324, 320, and 322, respectively, and provided to performer 102 through audio OUT 142 and headphones 106.

Thus, audio produced by any of performers 102, 102', and 102" is provided to the audio output of all of stations 100, 100', and 100" with a delay of (X+Y), or more if desired by the corresponding performer.

In an alternative embodiment, the local delay 132 can impose a delay of less that (X+Y). For a station having non-zero values for the outbound delay 136, such as station 100 in the scenario described above having values of Y for outbound delay for line one 236*a* and X for line two 236*b*, a local delay of 132 can be reduced from (X+Y) to as little as the greater of X and Y. The amount of this reduction is subtracted from the values of both outbound delays 236*a* and 236*b*. In this way, performer 102 can operate with the advantage of having a lower local delay (equaling the greater of X and Y), but performers 102' and 102" have a longer local delay of (X+Y).

In still another embodiment, the minimum value for local delay 132 or 132' described above can be overridden by the performer and be reduced below that prescribed by the above description. However, in so doing, the corresponding performer will hear the local performance earlier with respect to the other performances than the other performers hear it. Consequently, their perception may be that he is playing too late, even though his perception is that he is playing in time with the others. This is only tolerable for small values before it has an adverse effect on the collaboration.

In still another embodiment, communication channel 150 is a switched packet network, such as the Internet, and audio processors 108, 108', and 108" comprise computers wherein communication channel interfaces, such as 120 and 120' (the one corresponding to audio processor 108" is not shown), each comprise a broadband connection, such as that provided by a DSL or cable modem.

Figure 4:
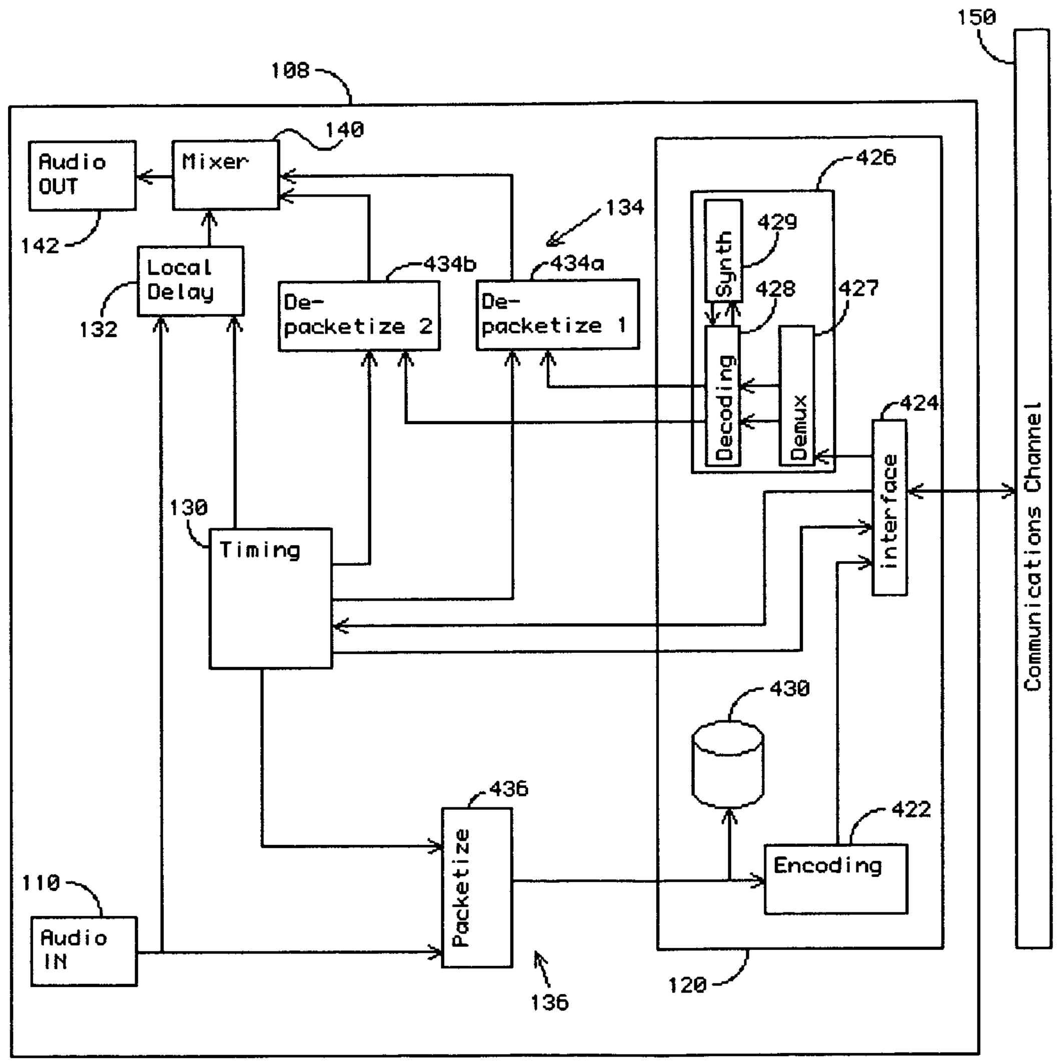
FIG. 4 is a detailed block diagram of an audio processor 108 suitable for use with an Internet connection.

FIG. 4 shows such a switched packet network embodiment. Here, rather than entering a phone number for each remote musician, the remote station is designated by an address, in the case of the Internet, as an IP address. Well known in the art, an application implementing station 100 using the Internet would engage an online lobby, common in multi-player computer games, to make it easy for musician 102 to contact and connect with remote musicians 102' and 102". Not shown, but similarly well known, is the lobby server, which would be connected to communication channel 150. In lieu of the line select buttons 312 and 314 and touchpad 310, a graphical user interface (GUI, not shown) presents the lobby to each of the community of musicians interested in a collaborative performance. The lobby allows musician 102 to find musicians 102' and 102" with similar interests or appropriate or complementary skills. Lobbies such as these provide an easy forum for initiating a connection, and are strongly preferred over the awkward and error-prone manual entry of the IP address of a participating musician's remote station. An exemplary library of routines making implementation of lobbies considerably easier is the well known and respected GameSpy SDK by IGN Entertainment, Inc. of Brisbane, Calif.

Once connected through the lobby, timing control 130 can interact with its counterparts, e.g. timing control 130', on remote stations 100' and 100" through network protocol stack 424. In a direct analogy to the timing signals of the two-line telephone embodiment, the timing control 130 of station 100 can send a first signal packet directly to the timing control 130' of station 100', and receive a second signal packet in return. This is similar to the well known PING message, but has the advantage of testing the timing of more protocol and application layers. Also, some routers block the popular PING message, and so an alternative is preferred. However, unlike the two-line POTS implementation, communication between stations 100' and 100" are not required to pass through station 100. For this reason, the worst-case delay for a station is it's own measurements of X and Y (half the RTT between its first and second remote stations, respectively).

Further, timing control 130 and its counterparts, such as timing control 130', in remote stations 100' and 100" can initiate a clock synchronization among themselves, so as to provide mutually synchronized timestamps. Such synchronization can be achieved by algorithms well known, such as the network time protocol (NTP). Though not strictly required, since streamed data carries an inherent timing implied by the sample rate, a synchronized timestamp does provide a convenient reference for audio stream synchronization, and is used in the description below:

The audio performance of performer 102, captured by microphone 104, is accepted by audio IN 110 where it is digitized. The resulting digital audio stream is passed to local delay 132, and outbound delay 136 implemented as buffer 436, where individual digitized samples, representing for instance 10 mS of the audio stream, are collected into packets. This frame size of 10 mS is a preferred balance point between having a short delay imposed by the packetizing process of buffer 436 which corresponds to an imposed outbound delay, and packet overhead, since each packet requires a certain amount of data to represent routing, handling flags, checksums, and other protocol-mandated required when the Internet (or other network) is used for communication channel 150. A longer frame size, say 20-30 mS, results in less protocol overhead (50% to 33%, respectively) and therefore lower aggregate bandwidth, but that greater outbound delay is imposed at buffer 436. Conversely, a shorter frame size, say 5 mS, would lower the outbound delay, but increase the protocol overhead (200%).

For comparison, the protocol overhead of a UDP/IP packet is 28 bytes, while a 10 mS frame of uncompressed 16 KHz 16-bit audio samples with no dropped packet protection would be 320 bytes, or an overhead of about 8%.

The packets for each frame may be marked with a timestamp from timing control 130 in buffer 436 as they are packetized. Such a timestamp preferably indicates the current time plus the local delay setting of delay 132. Thus each packet is marked for when it is intended to be played.

Preferably, to minimize the bandwidth and/or to improve the resiliency of the transmission versus packet loss, the packet is passed from buffer 436 to coder 422 for encoding. Coder 422 and decoder 428 together comprise a CODEC selected to operate with the frame size imposed by buffer 436 and outbound delay 136.

Once processed by coder 422, the encoded packets are sent to all remote stations 100' and 100".

Packets are also recorded, preferably unencoded, in outbound packet store 430. As recorded in store 430, these packets represent a high fidelity, loss-less record of the performance of performer 102. When a performance is complete, the files in store 430 and the corresponding stores of remote stations 100' and 100" can be exchanged so that each station is left with a high quality recording of the entire collaborative performance. The timestamps of each packet allow the files corresponding to each station to be synchronized by appropriately aligning the timestamps. Such an exchange of files can be accomplished using well known protocols such as FTP. The manual synchronization of multiple audio tracks is well known from commercially available multi-track audio editing tools.

However, in the preferred embodiment, an automatic process (connection to network protocol stack 424 not shown) would exchange the files recorded in store 430 and the remote stations, and upon receipt combine them into a single, synchronized, multi-track audio file format, such as Audio Interchange File Format (AIFF) or the WAVE file format, both well known ways to storing multi-track digital audio waveform data.

Packets received by network protocol stack 424 from remote stations 100' and 100" are provided to decoding section 426. If necessary, packets from each remote station are separated by demux 427 so that the decoding of a packet from one remote station is influenced only by packets previously received from that same remote station, and so that packet only influences packets subsequently received (or lost) from that same remote station.

Each packet is processed by decoder 428, which implements the conjugate process imposed by coder 422. In case a packet is missing by the time it is required, decoder 428 preferably interacts with synthesizer 429 to create a patch. The patch is a replacement packet that represents a best-guess of an appropriate audio signal to fill-in for the missing packet. The synthesizer 429 preferably operates to minimize the impact of a lost packet. While an existing example of the synthesizer 429 is a burst of noise having an amplitude similar to that of the previous packet, a more musically competent process is described below in conjunction with FIGS. 5 and 6.

After being decoded, packets are provided to remote delay 134, implemented as a separate remote delay buffer for each remote station 434*a* and 434*b*, for remote stations 100' and 100", respectively. If synthesizer 429 generates a replacement packet in case one is not received, the synthesized packet is placed in the appropriate remote delay buffer 434*a* or 434*b*. If a corresponding packet is subsequently (and timely) received, it is inserted into the appropriate delay buffer 434*a* or 434*b*, overwriting any replacement packets. If a packet is received by a delay 134 after one or more replacement packets have been used, or after its own replacement packet has started to play, a fixup is preferably provided which minimizes the discontinuity as actual data is resumed and replacement, synthesized data is discontinued.

As audio data in remote delay buffer 134 comes due, it is sent to the mixer 140 and converted into an analog signal by the audio OUT 142.

In such an embodiment, controls such as level controls 320, 322, 324, delay preset 330, and indicator 332 can be implemented with by the GUI (not shown), as is well known in the art.

Preferably, the dwell time of actual audio data in remote delay buffer 134 is minimized. With a perfect network, packets traversing communications channel 150 would have a precise, constant transport time. Data arriving from the remote station having the greatest latency would be decoded and immediately passed through remote delay buffer 134 to mixer 140. Only the packets coming from a remote station having a lesser associated latency would remain in the remote delay buffer 134 for any significant time.

However, the present-day Internet is not perfect in that way and packets are subject to varying delays. To minimize the impact of such delays, remote delay buffer 134 will hold packets for an additional amount of time so that a higher percentage of packets arrive in time and a lower percentage of replacement packets are needed.

While most personal computers come equipped with microphone and earphone jacks and supporting electronics sufficient to implement audio IN 110 and audio OUT 142, more sophisticated hardware is available, such as the FIREBOX™ manufactured by Presonus Audio Electronics, Inc. of Baton Rouge, La. The advantage of such devices is a higher quality digitization, less conversion noise, the ability to readily support multiple microphones and/or pickups as previously discussed and providing comparably high quality of audio output, plus the availability of software support, for example by the Core Audio APIs provided in the Macintosh operating system by Apple Computer, Inc. of Cuppertino, Calif.

Figure 5:
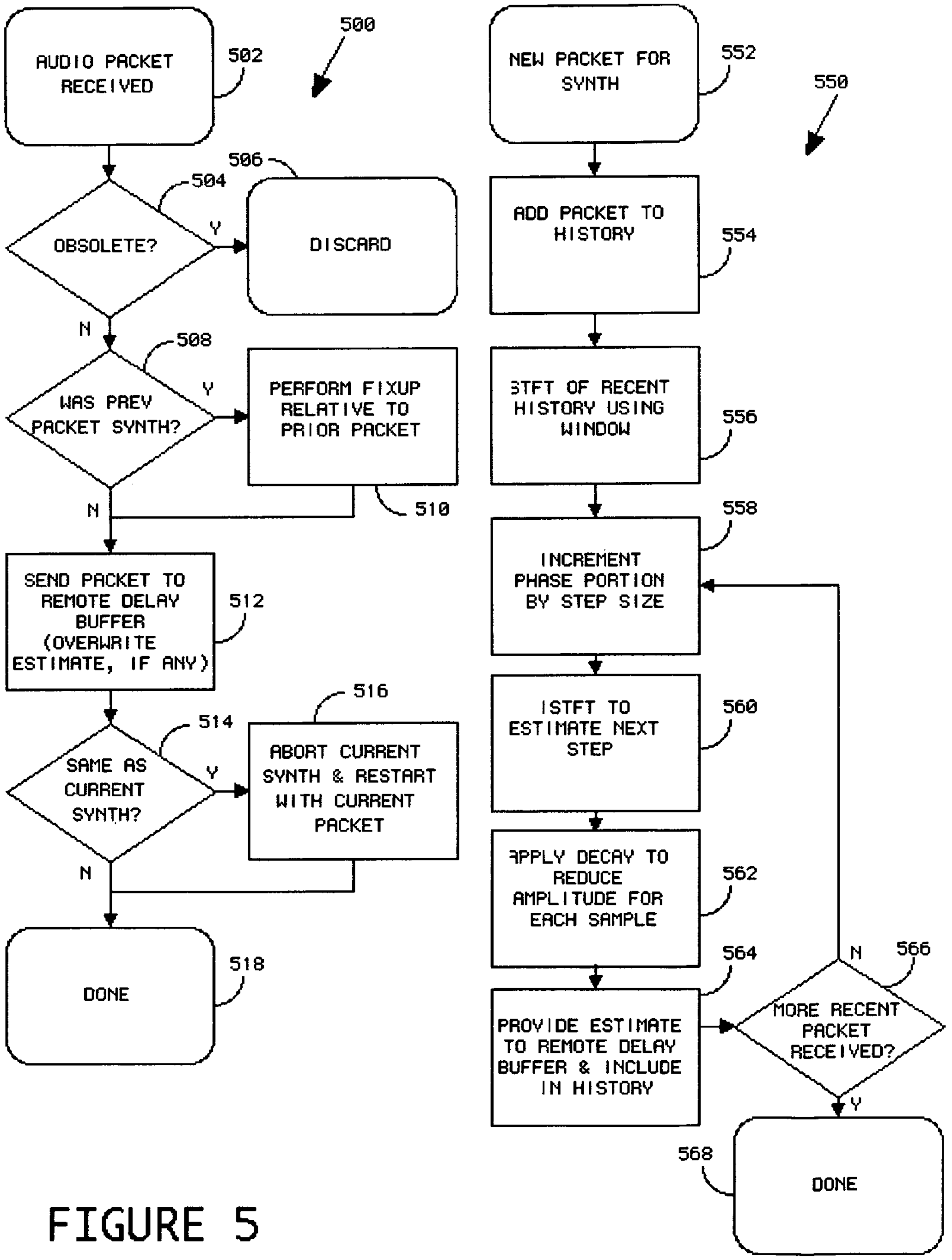
FIG. 5 is a flowchart for an improved CODEC decoder 428 well suited to real time musical signals; and, FIG. 6 is a diagram illustrating the operation of the improved CODEC coder 422 and decoding section 426 for handling musical events.

FIG. 5 is a flowchart showing a preferred process implemented by decoding section 426.

Synthesizer 429 implements a mathematical model intended to provide a best-guess prediction of the vocal or instrumental performance by a remote performer when subsequent packets are lost. Thus, if a packet is not lost, a high quality reconstruction from CODEC decoder 428 is used, but if the packet is lost, then the packet is substituted with a synthesized prediction of what the missing packet(s) might have sounded like. Upon resumption of timely received packets, the playback stream is quickly crossfaded from the prediction back to the actual decoded stream. Fidelity drops momentarily, but the packet loss is overcome with a minimum of aesthetic impact.

Decoder 428 implements decoding process 500, which is initiated by the receipt of an audio packet from demux 427. Such a packet will be designated as belonging to a particular audio stream corresponding to a particular one of the remote stations, and the balance of process 500 will take place in reference to that stream.

If in step 504 the packet is determined to be so aged as to correspond to an interval (frame) which has already passed, or substantially so, then it is discarded in step 506—the audio playback for the corresponding interval has already been managed by other means. In step 506, the packet is discarded for playback purposes, however it may inform an extended synthesis process, described below.

In step 508, a determination is made whether a previously played packet was synthesized or not. If not, then the currently decoded packet is completely compatible with the prior packet, and processing continues at step 512.

However, if the previous packet was synthesized, then it is likely that the synthesis does not precisely agree in phase and amplitude of the corresponding signals. To merely follow a synthesized packet with an actual packet would probably result in an audible click or pop. Instead a fixup is made in step 510, which blends an additional synthesized packet with the actual packet, to allow a quick, but aesthetically acceptable transition. The resulting 'crossfaded' packet is used instead of the unadulterated actual packet.

In step 512, the packet is sent to the appropriate remote delay 134, for example, remote delay buffer 434*a* for packets corresponding to remote station 100'.

If synthesizer 429 is in the process of generating a replacement for the current, or later packet, this is detected in step 514 and in step 516, the synthesizer is halted and restarted using the current packet as its basis.

In step 518, the processing for the received packet concludes.

Synthesizer 429 executes process 550. The synthesis process 550 is initiated when synthesizer 429 is provided with an actual packet in step 552. A separate synthesis process may be active for the stream associated with each remote station.

Figure 6:
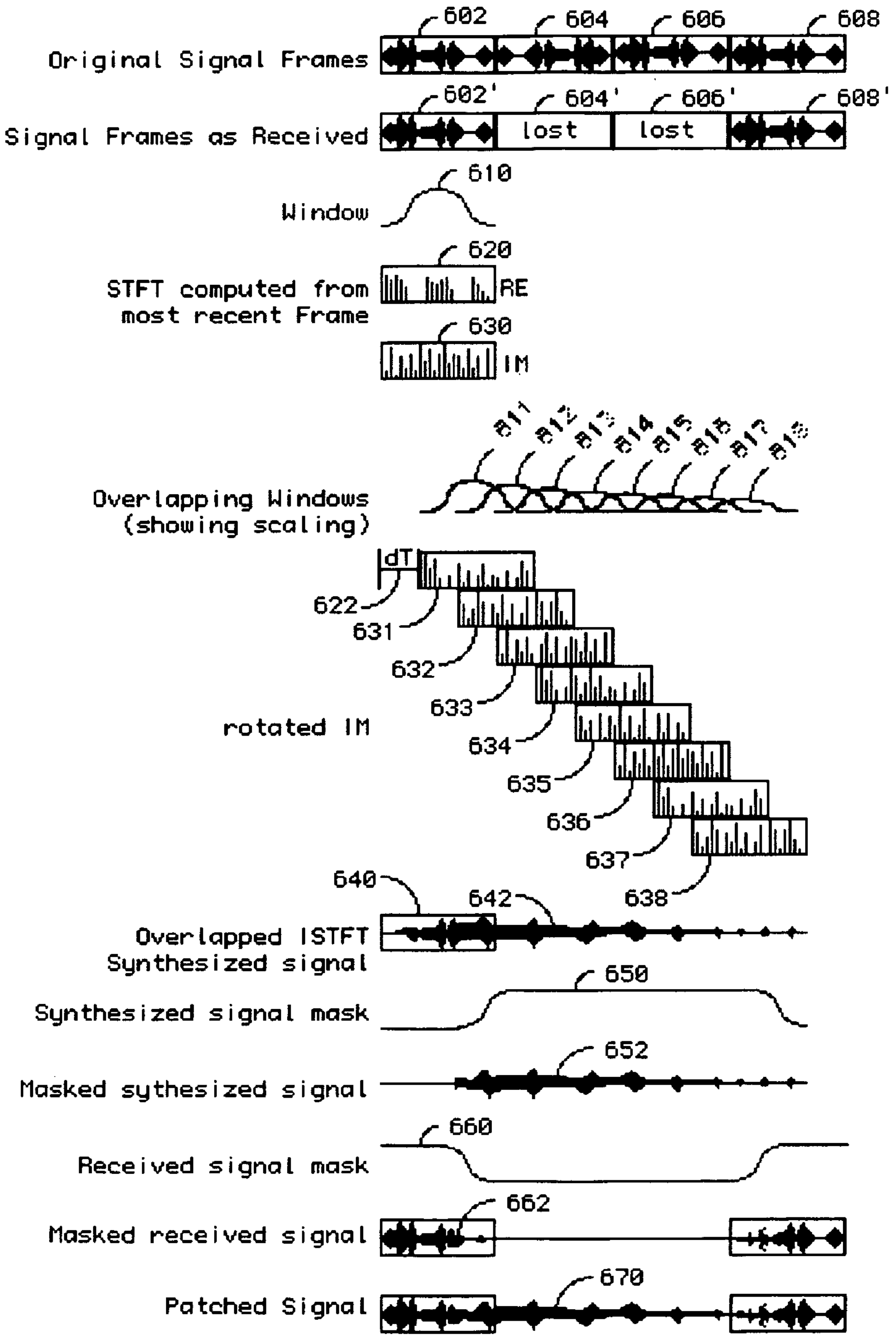

The following description also refers to FIG. 6. The audio signal as digitized by a remote station and gathered into packets is shown as packets 602, 604, 606, and 608. Only two of these are received at network protocol stack 424 as packets 602' and 608'. Gaps 604' and 606' correspond to packets that were never received, or were too late to matter. Upon receipt, the packet is added to the history of the channel in step 554. This history is used to construct synthetic packets representing a best guess of what the actual packet would have contained (psychoacoustically speaking).

If the packets are unaugmented by coder 422 with any analysis, in step 556 the data from the decoded packet is transformed using a Short-Time Fourier Transform (STFT), to determine the amplitudes and phases of the frequency components represented in the packet. The STFT is a well known mathematical technique, most commonly seen in voice prints and used in speech recognition processes. The signal in received packet 602' is multiplied by windowing function 610 (in this example, a windowing function having a constant overlap-add for ⅓ of a frame step size), and the Fourier transform of the result is taken to provide real part 620 and imaginary part 630. Real part 620 represents the amplitudes of the signal's frequency components, while imaginary part 630 represents the component phases.

An alternative implementation, appropriate when bandwidth is less expensive than processing power, the STFT is preferably performed by coder 422 and embedded in the packet before sending. In such an embodiment, step 556 merely needs to extract the results of the STFT, rather than actually carry out the STFT function for each remote station.

Common choices for windowing functions 610 are a Hamming window, with step size 622 of ½ or ¼ of a frame, and a Barlett window, with a ½ frame step size.

In order to accommodate the fading of the window and to minimize the discontinuities in constructing a prediction of a missing waveform, the synthesizer produces a series of estimates of future packets, and adds those together as follows.

In step 558, the imaginary part 630 is incremented by a step size 622, representing an advance in time of dT. At each distinct frequency in the STFT analysis, a time shift of dT corresponds to a phase shift in the imaginary part 630. This phase shift is illustrated as new imaginary part 631 (and in subsequent iterations as 632, 633, 634, 635, 636, 637, and 638). In FIG. 6, these phase shifts are illustrations, and do not represent actual calculations.

In step 560, using the original real part 620 and the next phase shifted imaginary part 631, an Inverse Short Time Fourier Transform (ISTFT) is calculated.

In step 562, the resulting waveform is added with the appropriate time shift 622 and scale factor to the original packet waveform, contributing to result 640. The scale factor is a sample-wise reduction that is applied beginning with the sample corresponding to the first sample of (lost) packet 604. The result is a gradual fade-out. Overlapping window functions 611, 612, 613, 614, 615, 616, 617, and 618 each shifted by an additional incremental step size 622, illustrate the effects of this scaling, which produces a mild exponential decay which may be chosen to emulate a typical decay provided in the performance by the chosen instrumentation. The scaling effect provides a gradual fade-out when data is missing, as if whatever instruments were playing at the point where the packet was lost were merely allowed to sound, undamped. This choice will work well for short gaps of missing audio, but, for instance, will not work well to replace rhythms or drum performances.

In step 564, as the simulated waveform 642 is accumulated, the current buffer 640 is transferred to the appropriate remote delay buffer with remote delay 134. If Actual data 602' is available (which it is, in this example) then simulated data 640 will be needed when packet 604 is late. The leading edge of synthesized signal mask 650 is multiplied against synthesized data 640 to get masked synthesized signal 652, likewise, the trailing edge of received signal mask 660 is multiplied by received signal mask 660 so that received packet 602' becomes the first packet of masked received signal 662. Before remote delay 134 is more than halfway complete in sending packet 602' to mixer 140, the decision is made that packet 604 is considered lost, and the transition is begun to synthesized data 642. The sum of masked received signal 662 and masked synthesized signal 652 provides patched signal 670, of which the first packet replaces 602' as the source for the next sample to be sent to mixer 140.

Meanwhile, lacking a more recent packet being received in step 566, synthesis process 550 iterates to step 558. In this iteration, phase shifted imaginary part 632 is calculated in step 558, a corresponding portion of synthesized signal 642 is computed in step 560, and each sample of the result is reduced by the appropriate scaling factor in step 562.

The scaling factor starts as a value very near to, but less than one, for instance, 0.9992. This factor is applied to all contributions to the first sample of synthesized signal 642 following packet 640. Each sample thereafter is scaled by a compounding of this value, i.e. 0.9992^2, 0.9992^3, etc., which will produce a gradual, exponential decay. In the case of a coded having a frame size of 10 mS and a sample rate of 16 KHz, the synthesized signal will be 96% faded out in ¼ of a second. Faster or slower fade rates can be selected.

With each revisit to step 564, the oldest frame currently updated is re-written to the corresponding buffer in remote delay 134. In the case of the second iteration involving imaginary part 632, this is still the first frame of patched signal 670. Not until the next iteration is the next frame (not outlined) of patched signal 670 sent to remote delay 134.

When packet 608' is received, if synthesis process 550 has concluded operations on shifted imaginary part 638, this will be detected in step 566 and synthesis processing will halt in step 568.

The handling of packet 608' is preferably to crossfade back to actual data, rather than simply to insert packet 608' into remote delay 134 an begin playing. The reason is that the synthesized signal will likely not match the actual signal, and the discontinuity would be audible. To overcome this, patched signal 670 is extended throughout the interval allocated to the frame of packet 608'. The synthesized signal mask 650 is reduced to zero, a seen on the trailing edge, and the received signal mask 660 is restored to unity, as seen on its leading edge. This allows the synthesized signal to be faded out as the actual signal from packet 608' fades in. Before the end of the frame corresponding to packet 608', the mixer is receiving 100% actual packet data as received and decoded by decoding section 426.

As mentioned above in conjunction with step 506, there is an alternative process for handling packets arrived too late to actually be played.

In this case, the too-late packet is used as the basis for a parallel synthesized signal. Iterations are performed using this most recent, but too-late packet, and a cross-fade is made as soon as possible giving preference to the synthesis derived from the more recent (but too-late) packet data. Whereas the processes 500 and 550 produce a predictor for missing packets, this parallel synthesis technique with preference given to the most recent, even if late, packet results in a predictor-corrector algorithm which, while not accurately reproducing the envelope of musical notes played, will significantly follow the tonal structure of a musical performance, even with sustained, critically late packets.

To the extent that a performer specifies excess remote delay 134, this is an advantage for extended buffering which provides more opportunity for actual data to arrive timely and reduce the need for synthesized data.

More elaborate recovery techniques can be employed, too, such as those suggested by Lonce Wyse et al. in "Application Of A Content-Based Percussive Sound Synthesizer To Packet Loss Recovery In Music Streaming," published in the Proceedings of the Eleventh ACM International Conference on Multimedia, 2003, Association for Computing Machinery, Berkeley, Calif. and Iddo Drori et al. in "Spectral Sound Gap Filling," published in the 17th International Conference on Pattern Recognition (ICPR'04)—Volume 2, pp. 871-874 by the IEEE Computer Society, Washington, D.C. Such techniques as these use much longer histories to estimate the structure of rhythmic contributions and can provide reason-able guesses as to where the next drum beat or note will be struck. As a result, a synthesized packet that corresponds to missing actual packet containing the onset of a drum beat may be more convincingly synthesized.

Various additional modifications of the described embodiments of the invention specifically illustrated and described herein will be apparent to those skilled in the art, particularly in light of the teachings of this invention. It is intended that the invention cover all modifications and embodiments which fall within the spirit and scope of the invention. Thus, while preferred embodiments of the present invention have been disclosed, it will be appreciated that it is not limited thereto but may be otherwise embodied within the scope of the following claims.

I claim:

1. An audio processor for use by a performer, said audio processor comprising:

an audio input for accepting a local acoustic performance by said performer in real time, said audio input providing a local signal representative of said local acoustic performance, said local signal being digital;

a communication channel interface, said interface having access through a communication channel to at least one remote audio processor, said access having an associated first latency, said interface further receiving from said at least one remote audio processor an inbound signal as a first plurality of packets, said inbound signal representative of a remote acoustic performance, said inbound signal being digital;

an audio output;

a delay able to add latency to the local and inbound signals, said delay having a non-zero local delay value, said delay adding a second latency specified by the local delay value to said local signal, said delay providing said local signal with said second latency to said audio output, said delay having a remote delay value associated with said at least one remote audio processor, said delay adding a third latency specified by said remote delay value to the inbound signal, said delay providing the inbound signal with said third latency to said audio output; and, a synthesizer;

said interface further sending the local signal without said second latency as a second plurality of packets to the at least one remote audio processor in substantially real time, said interface further comprising an encoder and decoder, said encoder performing an encode process upon said local signal prior to sending, and said decoder performing a decode process upon the inbound signal after receipt, said encode process comprising a transform of said local signal, said decode process comprising an inverse transform of said transform, said synthesizer interacting with said decoder to provide a patch for a late one of said first plurality of packets, said patch being computed from at least one of said first plurality of packets previously received;

said audio output converting the local signal and the inbound signal for said performer to hear.

2. An audio processor for use by a performer, said audio processor comprising:

an audio input for accepting a local acoustic performance by said performer in real time, said audio input providing a local signal representative of said local acoustic performance, said local signal being digital;

a communication channel interface, said interface having access through a communication channel to at least one remote audio processor, said access having an associated first latency, said interface further receiving from said at least one remote audio processor an inbound signal representative of a remote acoustic performance, said inbound signal being digital and received as a first plurality of packets;

an audio output; and, a delay able to add latency to the local and inbound signals, said delay having a non-zero local delay value, said delay adding a second latency specified by the local delay value to said local signal, said delay providing said local signal with said second latency to said audio output, said delay having a remote delay value associated with said at least one remote audio processor, said delay adding a third latency specified by said remote delay value to the inbound signal, said delay providing the inbound signal with said third latency to said audio output;

said audio output converting the local signal and the inbound signal for said performer to hear, said interface further sending the local signal as a second plurality of packets, without said second latency to the at least one remote audio processor in substantially real time, wherein said communications channel interface detects a gap in said first plurality of packets, said communication channel interface further comprising a synthesizer for constructing a patch to fill said gap.

3. The audio processor of claim 2 wherein said patch is selected from the group comprising silence, noise, a prior one of said first plurality of packets, and an inverse transform of a time-shifted result of a transform of the prior one of said first plurality of packets.

4. The audio processor of claim 2, wherein said communications channel is the Internet.

5. The audio processor of claim 2, further comprising a store, said store receiving said local signal from said audio input, said store making a first high fidelity record of said local signal, said store further having a Connection to said communication channel interface, said store sending said first high fidelity record to said at least one remote audio processor, said store receiving a second high fidelity record from said at least one remote audio processor, said first high fidelity record and second high fidelity record combinable into a synchronized file.

6. A system for initiating a collaborative performance among a plurality of audio processors according to claim 4, said system comprising a server connected to said communication channel, each of said plurality of audio processors further having an address, said address being communicated to said server, said server providing said address to others of said plurality of audio processors, said address being used by the others to establish said collaborative performance.

7. The system of claim 6, wherein each of said plurality of audio processors further comprises a user interface able to accept at least one attribute of said performer selected from the group comprising interest and skill, said at least one attribute being provided through said communication channel interface to said server, said server providing said at least one attribute to others of said plurality of audio processors, the attribute being used by the others to find said performer by said attribute.

8. A method for real time, distributed, acoustic performance, comprising the steps of:

a) providing a first audio processor having access through a communication channel to at least one other audio processor at a corresponding remote location, said access having a first latency associated with the other audio processor;

b) converting a local acoustic performance of a performer into a local signal in real time;

c) substantially immediately advancing said local signal through said communication channel to the other audio processor;

d) receiving through said communication channel from the other audio processor an inbound signal corresponding in real time to a remote acoustic performance at the corresponding remote location;

e) adding a non-zero second latency to said local signal;

f) adding a third latency to the inbound signal, said third latency associated with the other audio processor;

g) playing said local signal with said second latency and the inbound signal with the third latency for the performer to hear during said local acoustic performance;

h) detecting a gap in the inbound signal;

i) synthesizing a patch to fill said gap; and, j) substituting said patch in the place of said gap.

* * * * *